United States Patent
Moon

(10) Patent No.: US 11,463,418 B2
(45) Date of Patent: Oct. 4, 2022

(54) SYSTEMS AND METHODS OF ENFORCING COMMUNICATIONS SEMANTICS ON A PRIVATE NETWORK

(71) Applicant: Whitestar Communications, Inc., Apex, NC (US)

(72) Inventor: Billy Gayle Moon, Apex, NC (US)

(73) Assignee: Whitestar Communications, Inc., Durham, NC (US)

(*) Notice: Subject to any disclaimer, the term of this patent is extended or adjusted under 35 U.S.C. 154(b) by 373 days.

(21) Appl. No.: 16/518,538

(22) Filed: Jul. 22, 2019

(65) Prior Publication Data

US 2021/0029092 A1 Jan. 28, 2021

(51) Int. Cl.
*H04L 9/40* (2022.01)
*G06F 40/30* (2020.01)

(52) U.S. Cl.
CPC .......... *H04L 63/0428* (2013.01); *G06F 40/30* (2020.01); *H04L 63/0421* (2013.01); *H04L 63/0838* (2013.01)

(58) Field of Classification Search
CPC ............ H04L 63/0421; H04L 63/0428; H04L 63/0838; G06F 40/30
See application file for complete search history.

(56) References Cited

U.S. PATENT DOCUMENTS

| | | | | |
|---|---|---|---|---|
| 8,627,506 B2* | 1/2014 | Vera | ..................... | G06F 21/6263 726/30 |
| 2012/0109830 A1* | 5/2012 | Vogel | ................... | G06Q 20/384 705/75 |
| 2014/0040638 A1* | 2/2014 | Barton | ..................... | G06F 21/72 713/193 |
| 2015/0326522 A1* | 11/2015 | Pu | .......................... | G06Q 50/01 726/26 |
| 2017/0193234 A1* | 7/2017 | LeVasseur | ............ | H04L 9/3213 |

OTHER PUBLICATIONS

Dissenter, Frequently Asked Questions at https://dissenter.com/help/faq, Apr. 16, 2017.
https://www.web2pdfconvert.com/, 2018.
https://www.codester.com/items/13206/web2pdf-ios-source-code, 2018.
Zeroisation at https://en.wikipedia.org/wiki/Zeroisation, 2018.

(Continued)

*Primary Examiner* — Linglan Edwards
(74) *Attorney, Agent, or Firm* — Deepali Brahmbhatt; Devlin Law Firm LLC

(57) ABSTRACT

The systems and methods enforcing communications semantics on a private network, comprising: establishing a secure and encrypted private network with a whitelist of two or more profiles using alias and digital keys; associating each profile with equal access and control irrespective of its associated computing device capability; embedding communication information at source or destination in secure endpoint object; embedding communication information in transit in a secure conversation object wherein each conservation object has one or more message objects with one or more attributes comprising of source address, destination address, time sent, or time received; enforcing one or more of distribution parameters or life cycle parameters for the communication information.

20 Claims, 9 Drawing Sheets

(56) References Cited

OTHER PUBLICATIONS

IBM Az/OS Cryptographic Services, Integrated Cryptographic Service Facility, Application Programmer's Guide, p. 50, 2011.
FIPS Pub 140-2, May 25, 2001.
DIBS at https://github.com/emin63/dibs, 2014.
https://github.com/bernardobelchior/distributed-backup-service, printed 2019.
https://github.com/afonsocastro96/SDIS-Project2, 2016.
https://sourceforge.net/projects/p2pbackupsmile/, 2010.
http://www.infostor.com/nas/58-top-open-source-storage-project-1.html, Dec. 26, 2013.
CDN disclosed at https://en.wikipedia.org/wiki/Content_delivery_network, 2015.
BitTorrent Speed to Strengthen BitTorrent Protocol, Connect users with (BTT) tokens, McBrown, Jan. 17, 2019 at http://blog.bittorrent.com/2019/01/17/bittorrent-speed-to-strengthen-bittorrent-protocol-connect-users-with-btt-tokens/.

* cited by examiner

SYSTEMS AND METHODS OF ENFORCING COMMUNICATIONS SEMANTICS ON A PRIVATE NETWORK

If an Application Data Sheet (ADS) has been filed on the filing date of this application, it is incorporated by reference herein. Any applications claimed on the ADS for priority under 35 U.S.C. §§ 119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The following Whitestar Communications, Inc.'s concurrently filed patent applications are incorporated herein by reference: (1) "SYSTEMS AND METHODS OF SALUTATION PROTOCOL TO COMMUNICATE USING A PRIVATE OVERLAY PEER TO PEER NETWORK." and patent application Ser. No. 16/518,292; (2) titled "SYSTEMS AND METHODS OF SECURING DIGITAL CONVERSATIONS FOR ITS LIFE CYCLE AT SOURCE, DURING TRANSIT AND AT DESTINATION" and patent application Ser. No. 16/518,406; (3) titled "SYSTEMS AND METHODS OF COLLABORATIVE APPLICATION ON A PRIVATE NETWORK" and patent application Ser. No. 16/518,491; (4) titled "SYSTEMS AND METHODS OF GESTURE TRIGGERED AUTOMATIC ERASURE ON A PRIVATE NETWORK"; (5) titled "SYSTEMS AND METHODS OF DISTRIBUTED BACKUP AND RECOVERY ON A PRIVATE NETWORK"; and (6) titled "SYSTEMS AND METHODS OF DELEGATION OR REPLICATION ON A PRIVATE NETWORK."

FIELD OF THE INVENTION

The present invention is in the technical field of establishing and controlling conversations in social media with the use of secure and encrypted private networks. More particularly, the present invention is in the technical field of enforcing communications semantics that enforce life-cycle parameters and distribution policies. More particularly, the present invention is in the technical field of retaining control, edition, modification and/or deletion rights to the original author of the content.

BACKGROUND

Current social media systems are enabled by central services provided by third parties. In essence, social media is interaction between two or more end-users that mirrors real-life situation where a third-party has no business interfering. But the digital world of the internet applications of social media do not align to the real-world frameworks.

Social media typically facilitates user-generated content including text, comments, photos, videos and voice. Traditionally these various media are generated through "online" interactions and are facilitated by one or more third party platforms such as Twitter, Facebook, Youtube, SnapChat, Instagram, Weibo, LinkedIn and many others.

In traditional social media systems, users create profiles via a service providers website or app and all the content is maintained, processed and stored by the social media company. In such systems, users rely on the social media companies to store and protect their sensitive user data both while in flight, i.e. in transit and at rest, i.e. either at source or destination.

While users don't pay "directly" for use of these services, the services providers generate revenue from its user content and meta data through directed ads and selling access to their subscribers content for data mining or harvesting. This revenue then offsets the cost of maintaining the centralized servers and data centers and in some cases returns dividends to their shareholders.

Unfortunately, there are a number of serious drawbacks to this architecture. Most notably is the broken business model that requires the service provider to monetize their customers, which in turn requires their customers to give some, if not all of their privacy.

Additionally, the service provides have recently gone into censorship or "de-platforming" of content based on their or their advertisers best interests and not necessary the interest of their users or user communities. In some cases the censorship is at the direction of a central government but in most cases it is carried out based on arbitrary decisions of the social media service provides.

Complicating the matter, should a competitor wish to enter the market to compete against the entrenched social media companies it takes tremendous capital to build out the data centers and facilities to onboard even a single user. As users join the new network, more resources must be added to the central networks to manage the traffic load and to store the content being created by their users. At the end of the day, the new social media company would once again have to monetize their customer base, solicit advertisers and adhere to government oversight. While the new company might impose a different set of censorship policies than the legacy companies its still censorship by a third party and not by end users.

Further, social media companies typically deploy simply one-way authentication and HTTPS to secure their user's data in flight. Many enterprise networks (as well as others) are able to put a "man in the middle" of such traffic using an HTTPS proxy, thus exposing all data in flight to the intermediary and allowing that intermediary to filter, read, copy and save user content without them being aware of it.

One-way authentication only authenticates or assures the user that when they connect to a sight that "claims to be" say instagram, that in fact it is instagram. The converse is not true. The cryptographic system does not authenticate the client software used by the user and therefore must trust higher level protocols to assure that a user that claims to be user A is in fact user A, for example through passwords or other means.

Both sets of "keys", the ones that attest to the service provider's identity and the passwords used by the "user" are not changed very often, and can actually not change for years. This means that if either key is broken, that all the user's or even sights' data can be exposed. Breaking the keys to access a sights meta data can expose all data of every user in the system. Breaking a given user's key can expose all of a user's stored content.

In summary, the current architecture of social media tends to lead to: (i) Third party censorship, sometimes legally, sometimes not; (ii) Lack of Privacy either on purpose or by accidental exposure; and (iii) Lack of free association.

The last point, lack of free association can best be understood by the fact that the social media companies can and do decide what user can and can not participate in their platform. Worse is that while excluding one user A from freely joining a given community and conversing with members of that community, the same platform may allow other members to make almost any claim about user A without allowing user A the ability to refute those claims. This leads to very bad social norms in which gangs of denizens roam from social media site to social media site spreading false or unsubstantiated claims about user A without user A being able to defend herself on any of those platforms.

Furthermore, because the user's content is held by a third party and the social media companies routinely change their terms of services, most users are unaware that their content may be retained or archived, indefinite. A frivolous statement which is deemed "social acceptable today" may be judged years into the future by a new set of standards and lead to harsh consequences including ability to get into schools and colleges, ability to get a job, ability to run for public office, etc. We call this effect "Future Guilt."

Still further problems exist in the semantics of existing social interactions on social media sites. When someone creates content, they don't "own" that content, the social media company does. Even with as simple as email, "ownership" of content is fluid and the semantics of "polite" conversation are not a part of the system.

For example, if user A creates an email message and sends it to user B and in that email, user A included content that she did not want to disclose to anyone else, there is nothing in the art that would prevent user B from saving that information away, copying it or forwarding it to someone else like user C. Neither is user B prevented from replying to user A and copying additional users D, E, etc. on that reply. This sort of "lack of control" of content is pervasive in today's social media systems and this leads to a lack of polite discourse amongst members of society.

Accordingly, in the existing solutions in the industry, once content is created and distributed to existing network of systems, it: may exist indefinitely; the user may not have the ability to edit or append to the original message; may be free copied and distributed by others either directly or via screen captures or copy/paste operations; the user may never be able to delete the content when they feel like it; third parties can exploit the data.

SUMMARY OF THE INVENTION

The present invention is systems and methods of enforcing communications semantics on a private network, comprising: establishing a secure and encrypted private network with a whitelist of two or more profiles using alias and digital keys; associating each profile with equal access and control irrespective of its associated computing device capability; embedding communication information at source or destination in secure endpoint object; embedding communication information in transit in a secure conversation object wherein each conservation object has one or more message objects with one or more attributes comprising of source address, destination address, time sent, or time received; enforcing one or more of distribution parameters or life cycle parameters for the communication information.

The systems and methods of enforcing communications semantics on a private network, further comprising: setting the default distribution or life cycle parameters at the profile; allowing customization of the distribution or life cycle parameters at the conversation object or message object by the source profile; wherein the distribution parameters include one or more of the following: redistribution allowed, redistribution count, redistribution time expiry; redistribution geographic perimeter, redistribution location marker, or redistribution geo port; or wherein the life cycle parameters include one or more of the following: scheduling transit time, read count, usage count, one-time passcode.

The systems and methods of enforcing communications semantics on a private network, further comprising: decrementing the redistribution count for each transit; preventing redistribution when redistribution count reaches zero.

The systems and methods of enforcing communications semantics on a private network, wherein the message object has one or more of the following properties: copying of the message object within two or more conversation objects is allowed freely for the source profile of the message object; the distribution and life cycle parameters are inherited from the conversation object the message object belongs to; or deletion of the message object by the source profile, private network wide zeroization, or expiry of the life cycle of all of the conversation objects it belongs to.

The systems and methods of enforcing communications semantics on a private network, further comprising: preventing deletion or copying of communication information outside of the whitelist of the private network if at the time of creating the communication information the redistribution count is zero; or preventing deletion or copying of communication information outside of one or more whitelists of the private networks included in redistribution.

The systems and methods of enforcing communications semantics on a private network, further comprising: preventing screen capture when the communication information is within a secure endpoint object; or preventing deletion or copying of the communication information inside of the private network that conflicts with one or more distribution or lifecycle parameters.

The systems and methods of enforcing communications semantics on a private network, further comprising: revoking the second profile from the whitelist of the first profile; automatically deleting all objects from the first profile, the second profile and the private network that have communication information between the first profile and the second profile.

The systems and methods of enforcing communications semantics on a private network, further comprising: accepting receipt of communication information from the profiles on one or more of the whitelists of the private network based on redistribution irrespective of the quality or content of the communication information; preventing receipt of unsolicited communication information on the private network; or providing indication on the first profile if any rules of the private network are violated.

The systems and methods of enforcing communications semantics on a private network, further comprising: setting a life cycle parameter of expiry time all communication information between a first profile and a second profile; automatically deleting all objects from the first profile, the second profile and the private network that have communication information between the first profile and the second profile after the expiry time.

The systems and methods of enforcing communications semantics on a private network, wherein the first profile computing device is one or more of the following: a personal computer, a laptop, a tablet, a handheld device, a smartphone, an internet of things device.

BRIEF DESCRIPTION OF THE DRAWINGS

The embodiments of this invention are illustrated by way of example and not limitation in the figures of the accompanying drawings, in which like references indicate similar elements and in which.

DETAILED DESCRIPTION OF THE INVENTION

Figure 1:
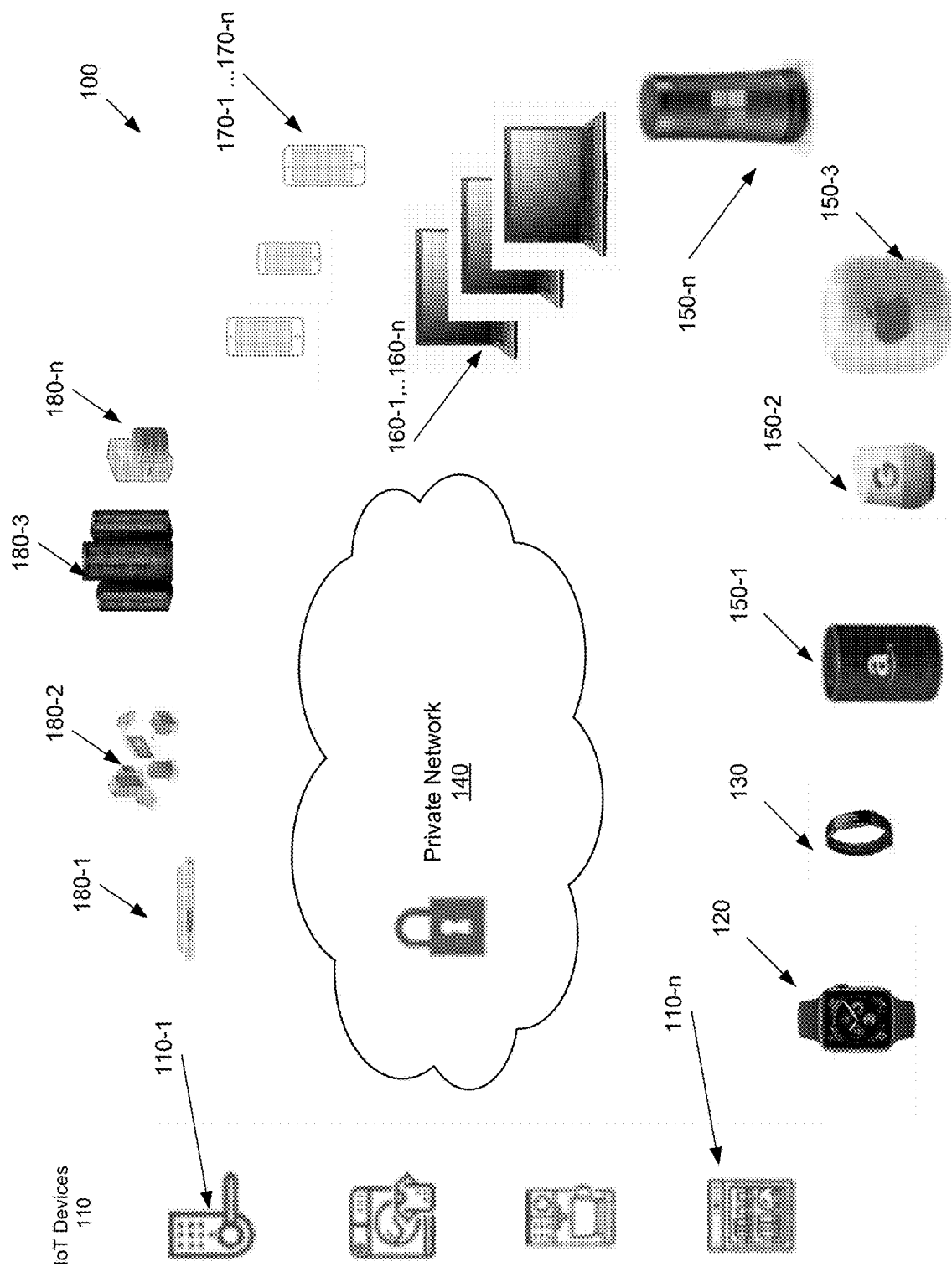
FIG. 1 shows a diagram illustrating an example of systems and methods of enforcing communications semantics on a private network with different types and categories of computing devices including internet of things devices.

The systems and methods of enforcing communications semantics on a private network includes techniques to incorporate life-cycle parameters and distribution policies that are enforced through encapsulation of data in secure objects. Data, in itself, travels inside smart and secure objects through the private network and adheres to life-cycle parameters and distribution policies set by the source or originator.

The systems and methods of enforcing communication semantics provides for flexibility and customization on content or data that originates from a user to the user in a completely distributed platform that allows both humans and machines to freely associate with one another assuming a trusted relationship with a secure channel is already established between the parties exchanging the information. In this platform, there is no central service. There is no cost to stand up the platform. There are no additional costs as each new user joins the social network. Instead of a central services storing user content and facilitating user content distribution and subsequent storing or recording, all these facilities are provided in a peer to peer social network by the users themselves.

No central authority can prevent the users from freely associating with one another or can exclude a given user from participation in social media with this system. Polite conversations are promoted because there is authentication on the origination of the content. Real life checks are also available on the private network when relationships can be revoked if behavior exceeds expected decency levels. The invention described herein provides a novel means by which polite, social and well-reasoned conversations can be carried out in the digital world. These aspects of the system are not left up to the users of the system, but rather are enforced by the operating code within the system. These features, together create an environment where bad actions and words and behaviors have consequences and can be dealt with by the users of the system directly.

With the private network, data flows encapsulated within secure objects. Secure objects include endpoint, conversation and message objects. These objects transmit and receive messages and contents from applications using an automated application programming interface.

Endpoint objects reside on a computing device or with a person in the private network. Conversation objects are created by a single endpoint and are used to contain a series of messages. A message object is a base unit for holding information to be shared between two or more endpoints.

Endpoint, conversation and message objects all have to adhere to associated objects of Distribution Policy and Life Cycle Parameters that are in the hierarchy or customized specifically at the object level. A Distribution Policy is an extensible policy that determine how and when and to whom a given object is distributed. A Life Cycle parameter determines when an object is born and when it dies, as well as any properties during its life time.

Endpoints objects contain, amongst other fields, one or more of the following digital information: One or more addresses that the given endpoint will listen on for incoming packets. A public key that should be used to encrypt messages sent to the endpoint. The alias of the public key defined. A list of zero or more conversation references. Each conversation reference is a unique ID that can be formed without coordination from any other endpoint. An endpoint ID. Again, this id is unique without the need of coordination. When the endpoint was created. The time the endpoint was last modified. Some binary content that can be used by higher layers of the application to convey whatever information it wants. A lifecycle policy. A distribution policy.

Conversations objects contain, amongst other fields, one or more of the following digital information: Default lifeCyclePolicy and default distributionPolicy for messages attached to the conversation. LifeCycle and Distribution policy for the conversation itself. An array of zero or more message contained within the conversation. An array of one or more endpoints participating in the conversation. A unique conversation ID. The ID of endpoint that owns the conversation. When the conversation was created. When the conversation was last updated. Optional binary content.

A message Object contains, amongst other fields, one or more of the following digital information: An array of one ore more distribution and life cycle policies. Note the same message may be contained in more than one conversation and it therefore has more than one policy set associated with it. A unique message ID. An array of one or more conversation ID's, one for each conversation that the message is contained within. The endpoint ID of the owner of the message. When the message was created. When the message was last updated. Optional binary content.

Distribution Policy contains, amongst other fields, one or more of the following digital information: Can the object the policy is applied to be redistributed. If it can, how many times can a message be redistributed. How long to wait when the object is being changed before re-distributed the object. A location marker (lat, lon, altitude). Should the object associated with the policy be redistributed when idle. Should the object associated the policy be sent to everyone. Should the object associated with the policy be sent to any one. Should the object associated with the policy be sent when near the location marker.

Life Cycle Policy contains, amongst other fields, one or more of the following digital information: When should the object associated with the policy be born. Is birth enabled. When should the object associated with the policy die. Is death enabled. How many times can the object associated with the policy be read. Should reads be limited. A location marker (lat, lon, altitude). Should the object associated with the policy be alive when near the marker.

In addition to these objects, there are a number semantic behaviors that are enforced by the operating system to assure that "good behaviors" from the users of the system are allowed while bad behaviors are prohibited. These semantics include the following: Every object has an owner as defined by a given endpoint ID. Ownership of an object can never change. Only the owner of an object may edit or delete the object. Objects can never be copied or screen captured. An object can only be forwarded to someone if the owner of the object allows for redistribution. Each time it is forwarded, the maximum number of redistributions count is lowered by 1. When that count reaches zero, the object can not be forwarded any further.

When the owner of an object deletes an object, then that object and every object that it contains (references) is deleted from the owner's device as well as every other device that has received a copy of that object. Note that deleting an object may involve cryptographically scrubbing the object from the underlying storage system.

If a user (endpoint) terminates its relation ship with another user by, for example, deleting that user's endpoint information from her device, then all objects from user B on user A's machine are removed from user A's machine and all objects from user A on user B's machine are removed from user B's machine.

Objects may be deleted based on their life cycle policy. So, for example, user A may have accepted a relationship with user B for 7 days (setting his endpoint object's life cycle to 7 days and sending it to user B.). At the end of that week, then user A's endpoint ID will automatically be deleted from user B's device and consequently, all objects exchanged between user A and user B will also be deleted.

This set of "tit-for-tat" rules, along with life cycle and distribution policies and strong ownership rules assure good behaviors with consequences for maintaining good relationships with ones social network.

Different embodiments described herein include components or structures to perform the described functionality. A "component" or a "module" as used in this invention disclosure, includes a dedicated or shared processor and, typically, firmware or software modules executed by the processor. Depending upon implementation-specific or other considerations, a module can be centralized or its functionality distributed. A component or a module can include special purpose hardware, firmware, or software embodied in a computer-readable medium for execution by the processor.

In one embodiment, FIG. 1 depicts a diagram 100 illustrating an example of securely connecting computing devices through the private network as well as storing information securely on the computing devices before or after each transmission. In the example of FIG. 1, the environment includes a first IoT devices 110-1 through an nth client system 110-n, private network 140, a smart watch 120, a fitness tracker 130, intelligent voice assistants 150-1 to 150-n, personal computers from 160-1, . . . 160-n, smartphones from 170-1 to 170-n, servers from 180-1, . . . 180-n.

In an implementation, the IoT device 110 includes components related to network connectivity. In one implementation, the IoT device 110 includes speaker and/or microphone hardware and software components to enable receipt and execution of speech commands directly on the device. In another implementation, the IoT device 110 does not include a speaker and/or microphone capability to enable receipt and execution of speech commands directly on the device, yet the IoT device is able to communicate with the private network system to enable receipt and execution of speech commands translated to device specific SDK/API commands.

The data, information or content flow is always encapsulated using secure objects through the private network that complies with or enforces communication semantics. Because the data cannot escape from the private network and has to follow rules within the private network, the communication semantics are enforced dynamically in a de-centralized manner. This gives lot of flexibility and customization controls to the originator of the data.

The role of the computing device manufacturers is separated from the use of the computing devices in hosting applications. After purchase, a user of the computing device has control on how to use, configure and communicate using that device. Use of any central services including those from the device manufacturer become optional. In one embodiment, there are one or more aliases associated with each of the computing devices including the IoT devices. The IoT devices integrate with the private network with zero additional programming. Different categories of smart watches 120, fitness trackers 130, personal computers 160 are connected securely and with encryption. The Intelligent voice assistants 150 can be from a variety of providers like Amazon Alexa, Google Home Assistant, Apple HomePod, Microsoft Cortana etc. Smartphones 170 and servers 180 with more computing power, bandwidth and capabilities are also connected. For example, the smallest computing device, i.e. an IoT doorbell ring to the largest computing device, a full-fledged server, are both treated equal in the digital private network world.

A person of ordinary skill in the art would appreciate that by encapsulating information or data in objects that follow default rules including hierarchical and network-wide parameters from distribution and life cycle policies, the private network operates freely without a fear of malicious attacks or abuse related to misuse. An originator can create content that he or she desires to make public and distribute freely or distribute with customized restrictions. An originator can then customize the life cycle rules for the object holding the content accordingly, including for example, one time use of a passcode that expires or dies after it is read once. The originator retains control to change his or her mind and totally delete or erase such content from all of its recipients network wide.

Computing devices irrespective of their size, category or applications have powerful computing capabilities in terms of processing power and also have network bandwidth to connect. The systems and methods of modeling private network allow for these computing devices to connect seamless in a secure and encrypted manner after authentication. Each transaction is an authenticated exchange. Such exchanges eliminate spam. An unwanted sender is revoked from the whitelist of authenticated senders and cannot send spam.

Private Network 140 can be different wireless and wired networks available to connect different computer devices including client and server systems. In an implementation, private network 140 is publicly accessible on the internet through secure messaging protocol described herein. In an implementation, private network 140 is inside a secure corporate wide area network. In an implementation, private network 140 allows connectivity of different systems and devices using a computer-readable medium.

The messaging and notification between different components can be implemented using application programming interface (API) calls, extensible markup language ("XML") or Javascript Object Notation ("JSON") config file interfaces between different interfaces, Hypertext Preprocessor (earlier called, Personal Home Page) ("PHP"), Python, Node.js, Java/C++object-oriented programming or simple web-based tools.

Different components may also implement authentication and encryption to keep the data and the requests secure. Authentication of a device may be accomplished using public/private key, passwords, token, transaction, biometrics, multi-factor authentication or other methods known in the industry. Encryption may use data encryption standard (DES), TripleDES, RSA, Advanced Encryption Standard (AES) or other methods known in the industry.

Figure 2:
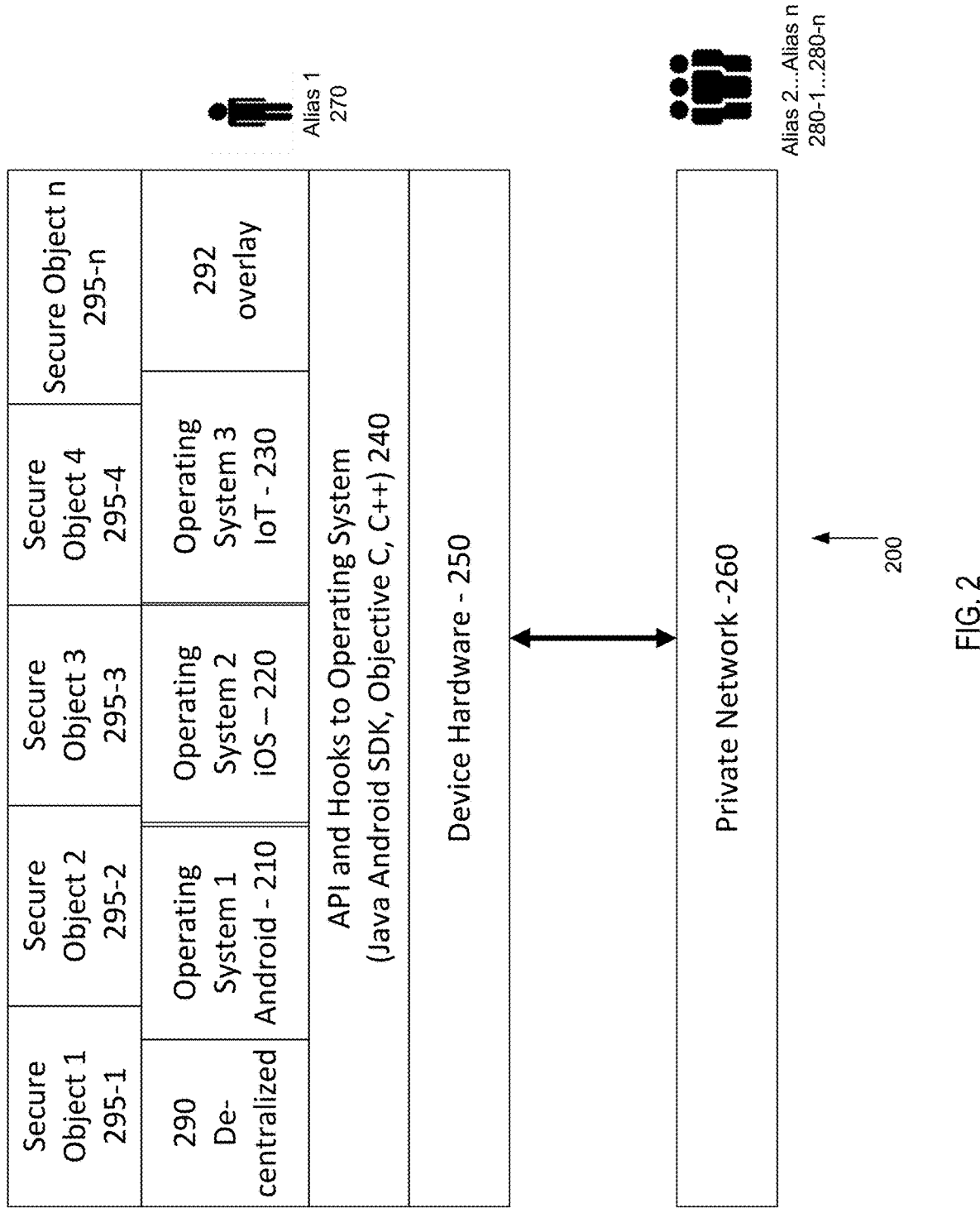
FIG. 2 shows an exploded view of a computing device with overlay network, according to one embodiment.

FIG. 2 is an exploded view 200 of different versions of an implementation that allow application programming interface, hooks, or overlay network connections in a computing device that hosts different applications. For example, Alias-1 270 is associated with a computing device that may have one or more operating systems including Android 210, iOS 220 or IoT operating system 230. The computing device includes device hardware 250 that can be controlled by the private network API/hooks 240 that are incorporated at a system level on the computing device. In one embodiment, depending on the computing device platform the private network overlay hooks are implemented using Java Android SDK, Objective C, or C++. In one embodiment, any and all communications are controlled using the private network overlay architecture that encompasses the operating system at 290 de-centralization module and 292 overlay network module. In one embodiment, a user can customize the alias to go in and out of the private network overlay architecture mode. The private network 260 includes other trusted alias 2 to alias n i.e. 280-1 to 280-n all of which can communicate with Alias-1 using authenticated, secure and encrypted channels. In one embodiment, the overlay network is based on peer to peer network. In one embodiment, the private network using an overlay network using the existing public network.

In one embodiment, the computing device includes secure object 1, 295-1, secure object 2 295-2, ... secure object n 295-n from the private network. A person of ordinary skill in the art would understand that information of or related to the private networks exists only within secure objects that interact securely with the different applications. These secure objects follow the rules of the private network and also comply with associated life cycle and distribution policies. These secure objects interact seamless within different applications while complying with their inherent rules and policies.

Figure 3:
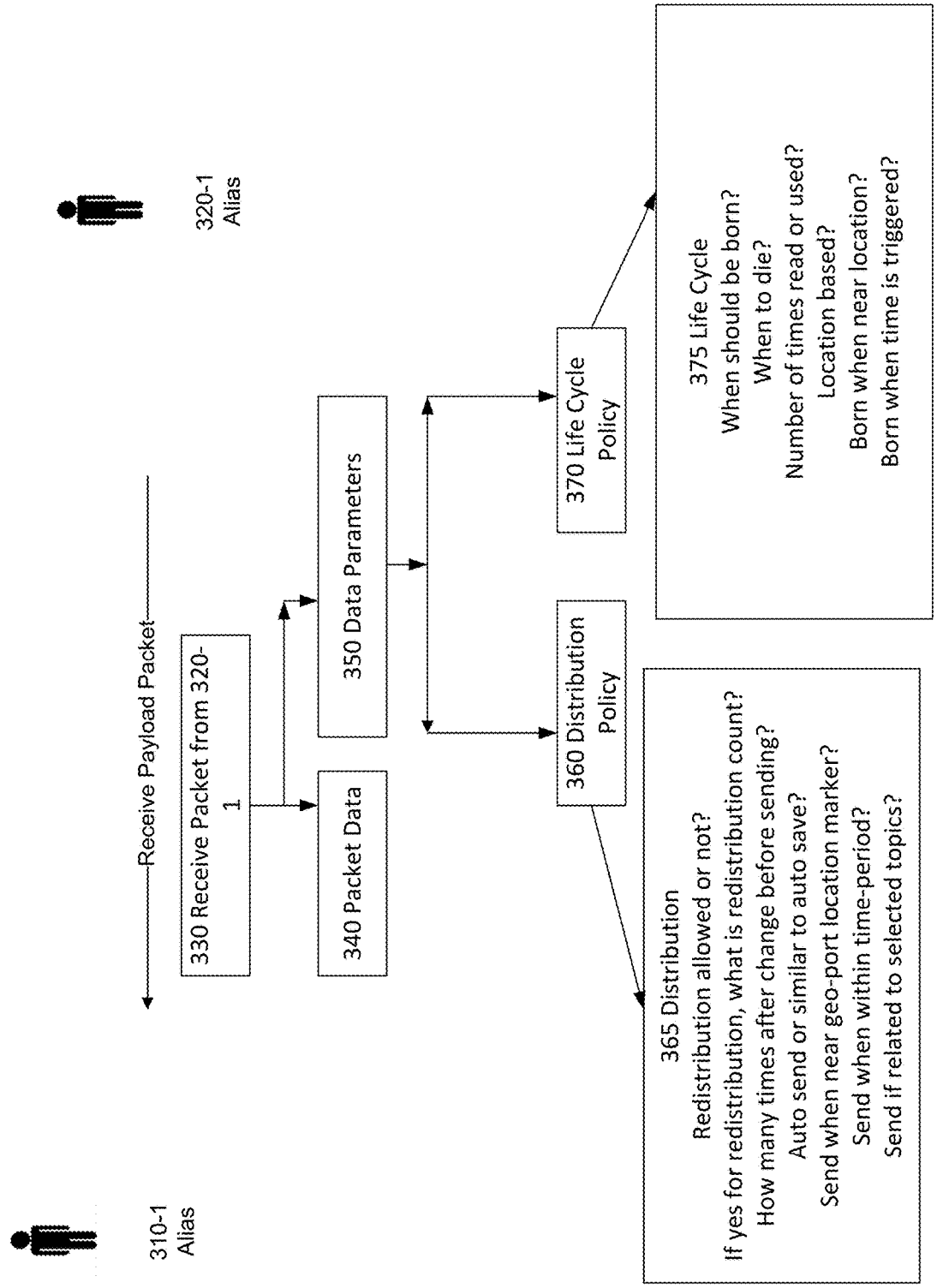
FIG. 3 is an exploded view of receiving a packet that complies with communication semantics, according to one embodiment.

FIG. 3 outlines 300 the receiving of a packet at an endpoint that includes payload of secure objects. Aliases 310-1 belongs to user 310 who owns one or more computing devices. The whitelist of Alias 310-1 allows receiving and sending packets to Alias 320-1. Alias 320-1 sends an initial packet 330. Since 320-1 is on the whitelist and the packet authentication is verified as well as checked for digital signatures to ensure that the packet is not corrupt in transmission, the Alias 310-1 decodes the packet to find secure objects.

At 340, the packet data is decoded into packet data 349 and data parameters 350. The data parameters includes 360 Distribution policy and 370 Life cycle policy. All of the secure objects in 340 Packet Data are associated with the distribution and life cycle policies.

At 365, the Distribution policy includes one or more of the following: Redistribution allowed or not? If yes for redistribution, what is redistribution count? How many times after change before sending? Auto send or similar to auto save? Send when near geo-port location marker? Send when within time-period? Send if related to selected topics?

The distribution policy would allow content to not go viral, in the sense, that even when users are on the whitelist, redistribution is restricted. A user may designate some sensitive information as something that cannot be redistributed at all. Many times, many users fear using the social media for the risk of misinterpretations or use of statements out of context. Here, with the distribution policy, the originator or source may speak in a digital safe private network of friends similar to having a private conversation with trusted family friends at home.

At 375, the life cycle policy includes one or more of the following: When should be born? When to die? Number of times read or used? Location based? Born when near location? Born when time is triggered? A person of ordinary skill in the art would understand that creation is not the same as being born. For example, a user may create a Thanksgiving greeting card earlier in October and request the object to be born a day before Thanksgiving. By default, an object may be born immediately after creation.

In one example, if a user is going to have a guest stay at his home, he may create a time-based passcode that can be used by that particular guest. The guest cannot then subsequently misuse that password. In one example, a coffee shop may allow access to its private network when a user is with a computing device at its location.

Figure 4:
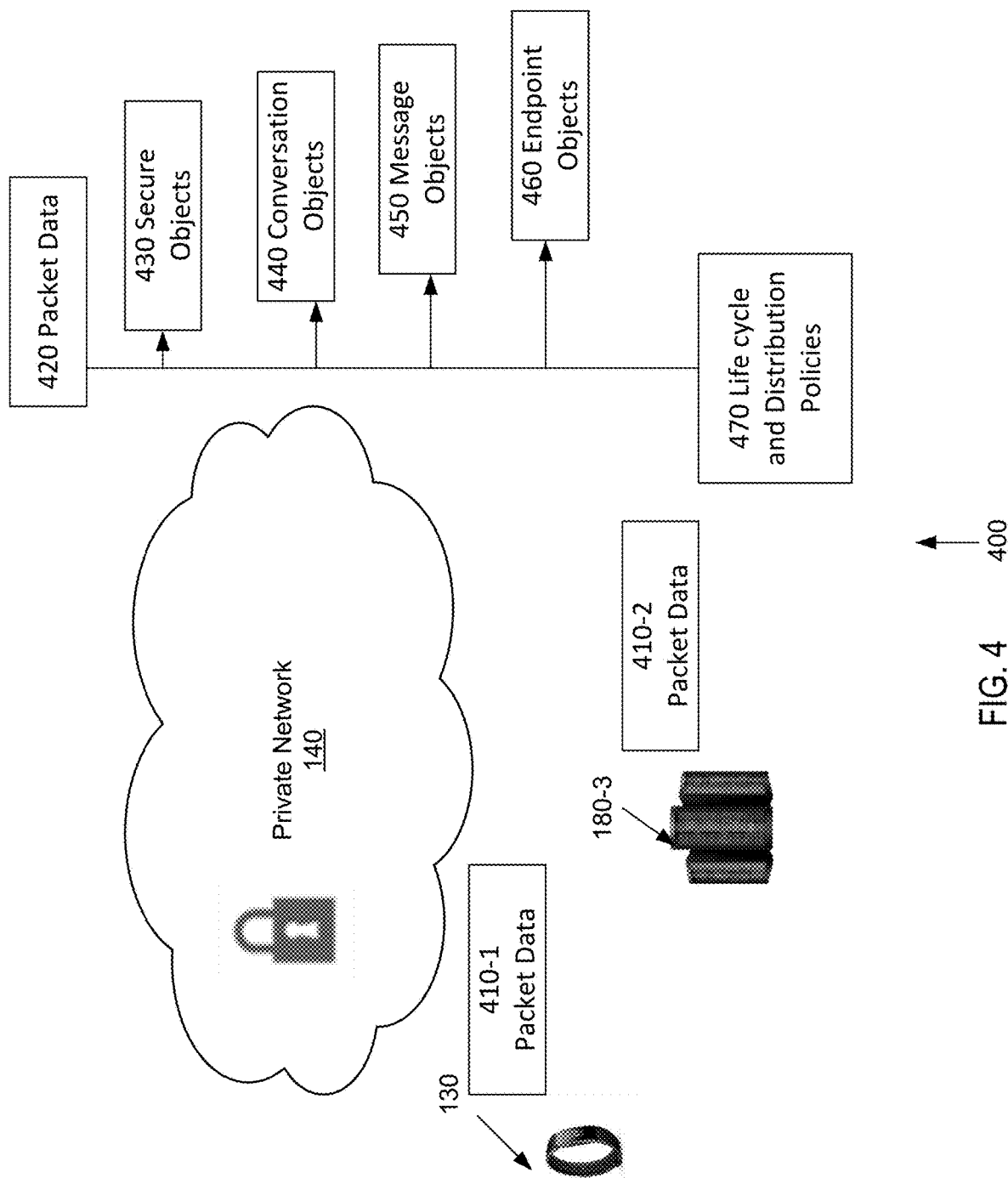
FIG. 4 is an exploded view of different types of packets and payloads, according to one embodiment.

FIG. 4 with 400 shows receipt of a packet from either 130 fitbit tracker device or a computing server 180-3 from FIG. 1. A person of ordinary skill in the art would understand that both device 130 and 180-3 although having different computing capabilities are treated as equals in the private network 140 of FIG. 1. Each device can configure the packet data according to its own capabilities. With artificial intelligence capabilities increasing, the device may make decisions based on past preferences of its owner. Owner can operate the alias for each of the device or allow the alias to automatically make certain decisions.

The packet data 420 has the extracted payload containing one or more secure objects 430. A person of ordinary skill in the art would understand that the secure objects can include one or more of endpoint objects 460 that are directed to receive one or more conversation objects 440 that include one or more message objects 450. All of the objects are associated with life cycle and distribution policies within secure object 470. Such properties could be uniformly associated for all of the secure objects within a packet data 420 or customized at individual or group levels depending on different contexts. A person of ordinary skill in the art would understand that different contexts could be based on the preferences of the source of the secure objects. Sender of the information could have default life cycle and distribution policies that apply by default to all of the objects that he or she sends using a particular alias. A packet that is redistributed may continue to have the life cycle and distribution parameters from its original sender.

Figure 5:
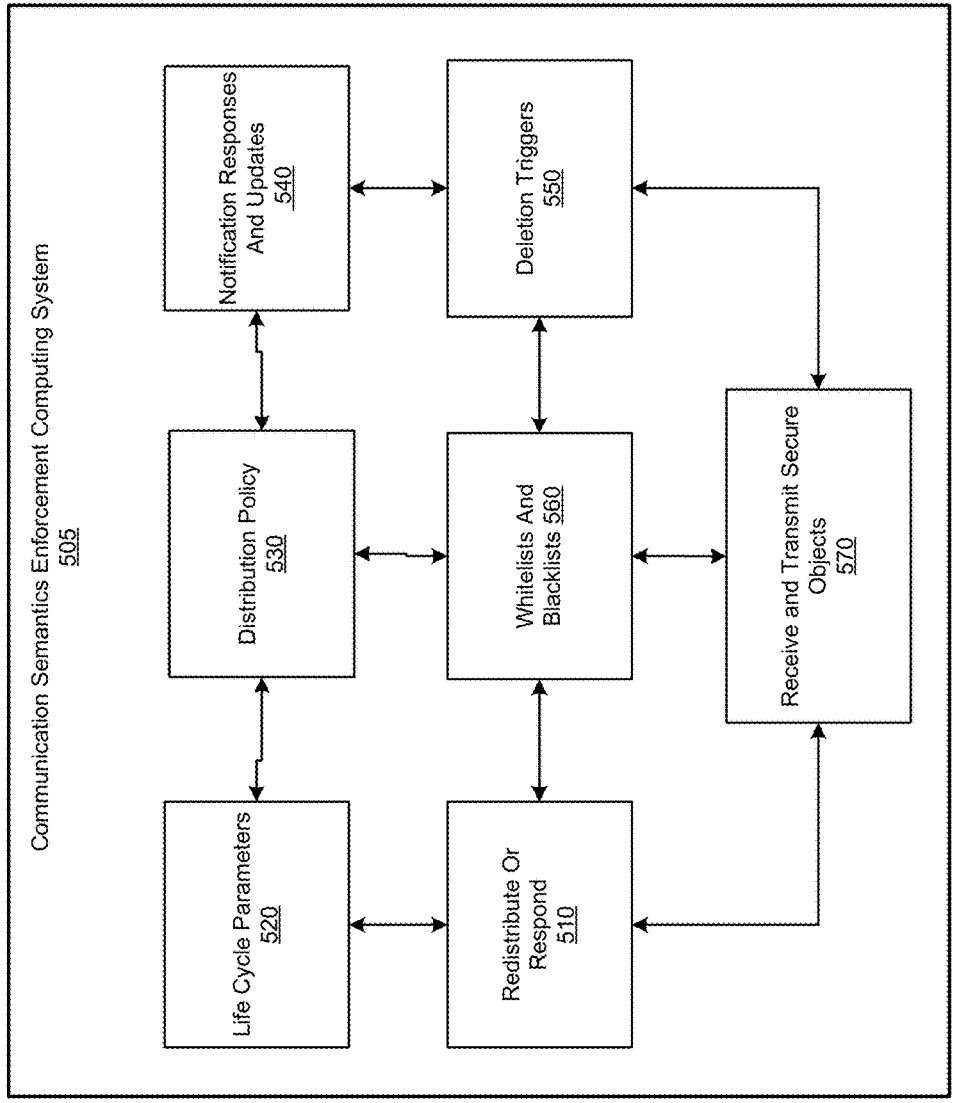
FIG. 5 is an exploded view of communications semantics application computing device, according to one embodiment.

FIG. 5 with 500 shows an exploded view of communication semantics enforcement computing device 505 and the modules incorporated. At 570, the module receives and transmits secure objects that include data, information or content that the users of the private network want to share with each other. At 510, the module checks each packet on distribution policy and makes a decision as to whether to redistribute to another alias or respond back to the sender. The decision on whether to redistribute or not would be in compliance with the distribution policy of the received secure object. The decision to whether give a response back to the sender depends on whether an automated response can be given back or whether the response back incorporates feedback from the user. At 520, the secure object is checked for life cycle parameters. For example, a received secure object that is created may be borne at a later time based on another trigger that is time based, location based on contextual on topic of the conversation. At 530, distribution policy module invokes steps to comply with the distribution policy for the secure object. At 540, notification responses and updates are handled by the module to ensure compliance with rules and semantics of communication of the private network. For example, there is a notification alert system that triggers subsequent actions within the secure objects that are triggered by events. Any content that is updated can be broadcast to the aliases that are interested.

Module 550 handles all of the deletion triggers and subsequent actions of deleting object, recycling space and collecting garbage data. The module also handles and updates linking of the data throughout the private network. Each data encapsulated within a secure object lives by itself and has its own parameters and policies to ensure that it can comply. Module 560 ensures that all the objects comply with whitelists and blacklists for the aliases on the computing device. Each packet data is secure and encrypted using a temporal key and complies with communication semantics of the private network. This ensures that security is not compromised at any point. Anonymous, malicious or spam type messages are eliminated.

The packet data may now be transferred to the upper layers to include higher level application protocols, including, for example, using Hyper-Text Transport Protocol ("HTTP"), Hyper-Text Transport Protocol Secure ("HTTPS") or Message Queuing Telemetry Transport ("MQTT") protocols. The device communication is encrypted using overlay Transport commands that include Transport control protocol ("TCP"), Web Sockets, MQTT or Constrained Application Protocol ("CoAP").

Figure 6:
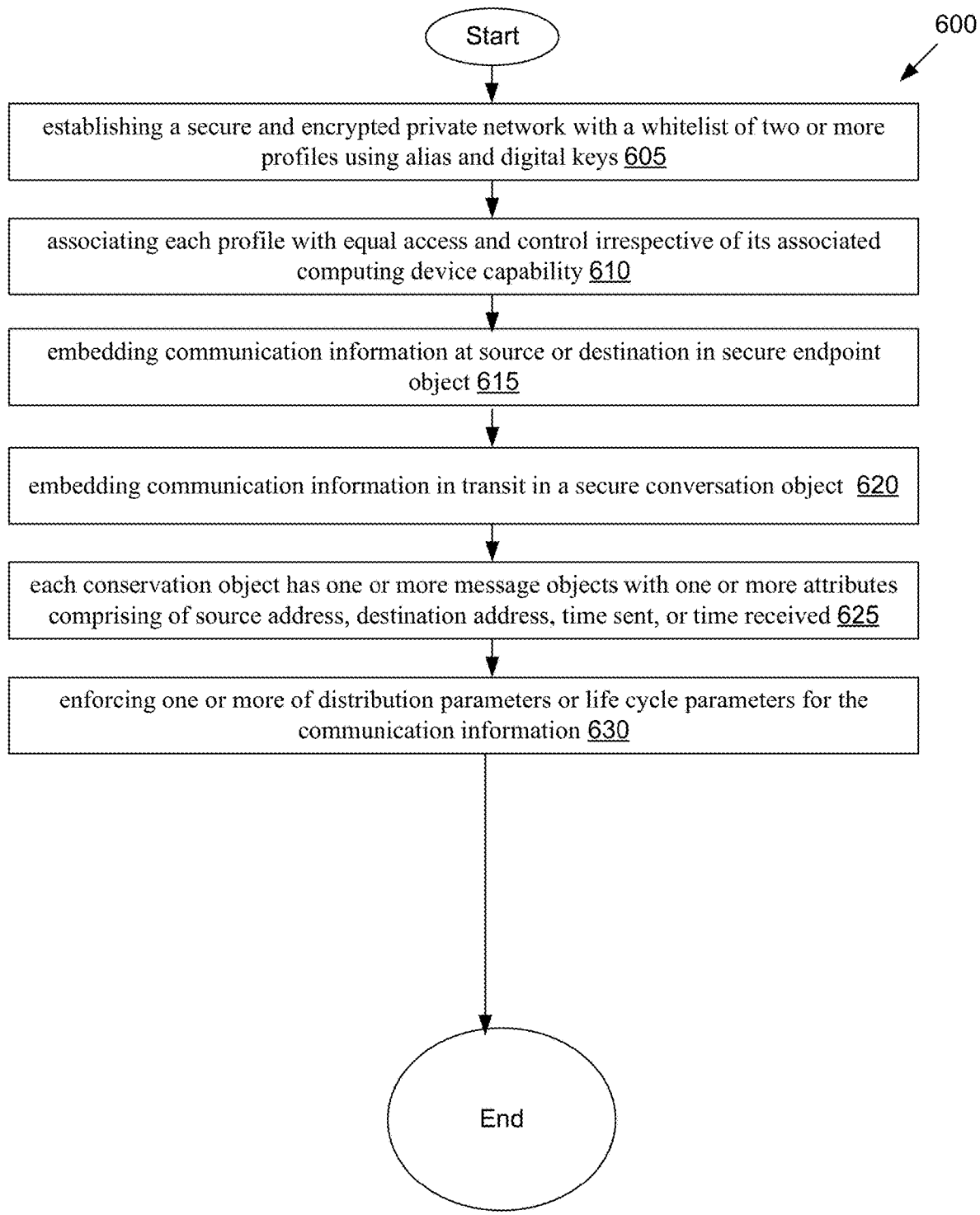
FIG. 6 shows a flowchart illustrating an example of a method of enforcing communications semantics on a private network.

FIG. 6 depicts a flowchart 600 illustrating an example of a method for enforcing communication semantics on a private network. The flowchart 600 is discussed in conjunction with the environment shown in the diagram 100 in FIG. 1. At block 605, begins with establishing a secure and encrypted private network with a whitelist of two or more profiles using alias and digital keys. At block 610, associating each profile with equal access and control irrespective of its associated computing device capability. A person of ordinary skill in the art would understand that there is no hierarchy between aliases that can be associated with a device or an owner. A smart device may include modules and algorithms to make independent decisions on the private network without user intervention. A person of ordinary skill in the art would understand that the encapsulated data acts like artificial intelligence enabled smart data. At block 615, embedding communication information at source or destination in secure endpoint object. At block 620, embedding communication information in transit in a secure conversation object. At block 625, each conservation object has one or more message objects with one or more attributes comprising of source address, destination address, time sent or time received. At block 630, enforcing one or more distribution parameters or life cycle parameters for the communication information. A person of ordinary skill in the art would appreciate that by following the steps outlined above that is inbuilt into the computing device, the private network enforces communication semantics flexibly with customized control at the data level. Such data can be then grouped or separated based on sender, receiver, time-based, location-based or topic-based contexts.

In one embodiment, the digital profile is associated with the user and/or the alias of the computing device on the private network. The embodiment further includes setting the default distribution or life cycle parameters at the profile; allowing customization of the distribution or life cycle parameters at the conversation object or message object by the source profile; wherein the distribution parameters include one or more of the following: redistribution allowed, redistribution count, redistribution time expiry; redistribution geographic perimeter, redistribution location marker, or redistribution geo port; or wherein the life cycle parameters include one or more of the following: scheduling transit time, read count, usage count, one-time passcode.

In one embodiment, the data is always encapsulated within secure objects that comply with redistribution count parameters. If redistribution count is zero, the secure object is not transmitted further. In one embodiment, packets from a rogue endpoint that misbehaves are discarded. In one embodiment, even when redistribution count is higher than zero, the secure object cannot be redistributed to an alias that is on the blacklist or not on a whitelist. The whitelists and blacklists are dynamic with aliases getting adding or removed at different times. The modules handling the secure objects also enforce that the data stays encapsulated and cannot be captured using screen capture photos. For example, the screen capture prevention may be implemented using the existing application programming interface from an existing operating system. Apple's iOS allows deletion of screen captured photos after they are captured. Android OS allows a flag that prevents screen capture when within an application. The overlay hooks of the private network can be tied to the screen capture hooks of the operating system. In one embodiment, the modules implementing the communication semantics prevent any action that is in conflict with the rules of the private network. Such rules include associated life cycle parameters and distribution policies. Such actions include deleting or copying of secure objects or data encapsulated within the secure objects.

In one embodiment, the copying of message objects is allowed with two or more conversation objects when the message objects originate at the same sender and the sender is triggering the copying action. In one embodiment, the distribution and life cycle parameters are inherited from the conversation object the message object belongs to. In one embodiment, the message object deletes itself or marks itself for deletion when there is a deletion command from the source profile, zeroization that is network wide or expiry of the life cycle parameter for its associated conversation object. In one embodiment, a relationship between two aliases may expire after a given time period allowing all related objects between them to be automatically deleted.

In a broad embodiment, the invention is systems and methods of enforcing communication semantics on a private network that allows providing enforcement of network-wide compliance to rules and restrictions with flexibility and customization at the encapsulated data level for a secure object. Any and all information flowing through the private network can be controlled and customized to follow certain rules and triggers which are set at the origin or source of the information.

Figure 7:
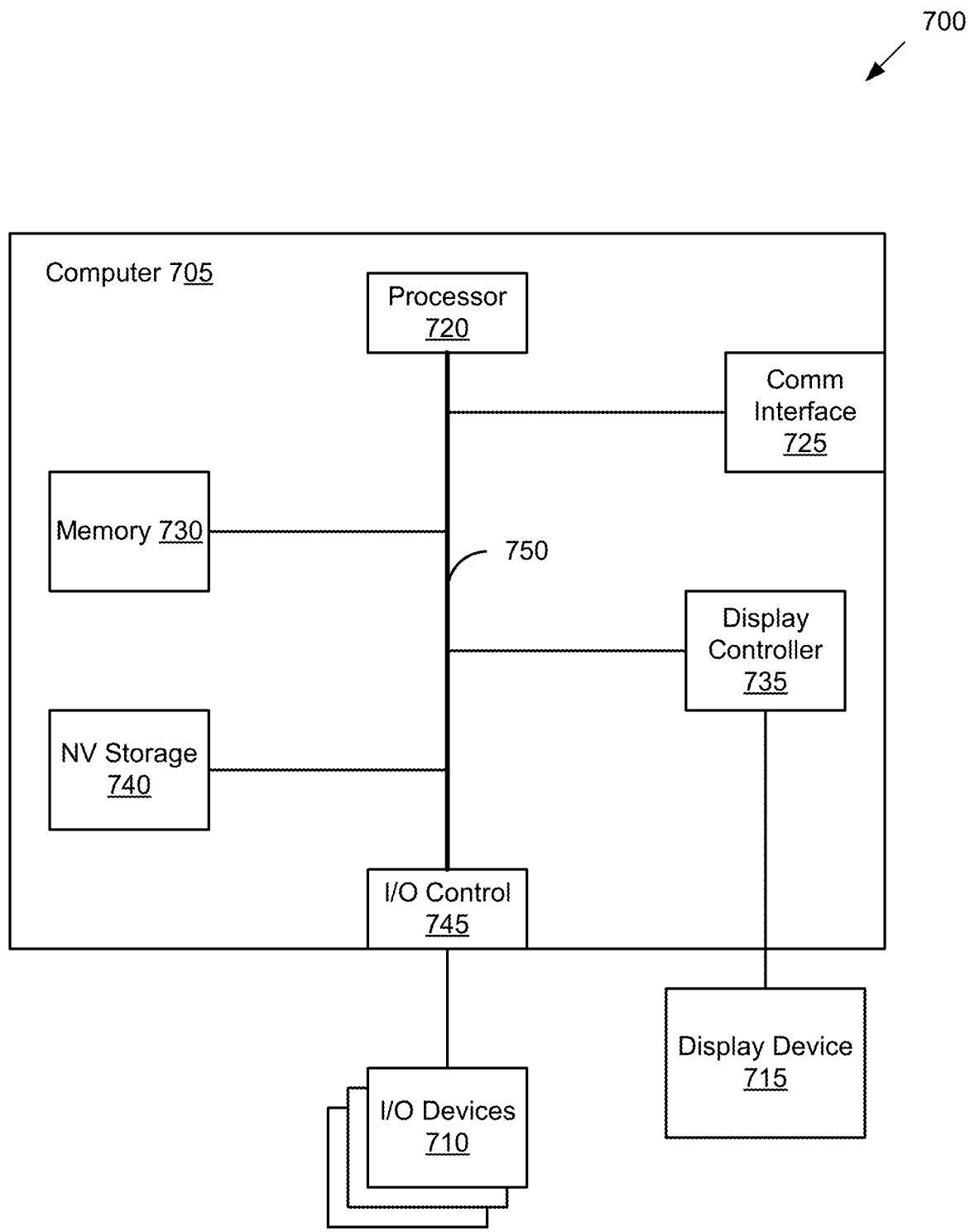
FIG. 7 is a schematic diagram of exemplary computing devices that can be used to implement the methods and systems disclosed herein, according to one embodiment.

FIG. 7 is a schematic diagram of computing device 700 that can be used to implement the methods and systems disclosed herein, according to one or more embodiments. FIG. 7 is a schematic of a computing device 700 that can be used to perform and/or implement any of the embodiments disclosed herein. In one or more embodiments, IoT device 110, SDK/API 120, Speak-to-IoT system 130, voice assistants 150, user end devices with mobile apps 170 or 180 of FIG. 1 may be the computing device 700.

The computing device 700 may represent various forms of digital computers, such as laptops, desktops, workstations, personal digital assistants, servers, blade servers, mainframes, and/or other appropriate computers. The computing device 700 may represent various forms of mobile devices, such as smartphones, camera phones, personal digital assistants, cellular telephones, and other similar mobile devices. The components shown here, their connections, couples, and relationships, and their functions, are meant to be exemplary only, and are not meant to limit the embodiments described and/or claimed.

FIG. 7 shows an example of a computing device 700 on which techniques described here can be implemented. The computing device 700 can be a conventional computer system that can be used as a client computer system, such as a wireless client or a workstation, or a server computer system. The computing device 700 includes a computer 705, I/O devices 710, and a display device 715. The computer 705 includes a processor 720, a communications interface 725, memory 730, display controller 735, non-volatile storage 740, and I/O controller 745. The computer 705 may be coupled to or include the I/O devices 710 and display device 715.

The computer 705 interfaces to external systems through the communications interface 725, which may include a modem or network interface. It will be appreciated that the communications interface 725 can be considered to be part of the computing device 700 or a part of the computer 705. The communications interface 725 can be an analog modem, integrated services for digital networks ("ISDN") modem, cable modem, token ring interface, satellite transmission interface (e.g. "direct personal computer" also known as "direct PC"), or other interfaces for coupling a computer system to other computer systems.

The processor 720 may be, for example, a conventional microprocessor such as an Intel Pentium microprocessor or Motorola power PC microprocessor. The memory 730 is coupled to the processor 720 by a bus 750. The memory 730 can be Dynamic Random Access Memory (DRAM) and can also include Static RAM (SRAM). The bus 750 couples the processor 720 to the memory 730, also to the non-volatile storage 740, to the display controller 735, and to the I/O controller 745.

The I/O devices 710 can include a keyboard, disk drives, printers, a scanner, and other input and output devices, including a mouse or other pointing device. The display controller 735 may control in the conventional manner a display on the display device 715, which can be, for example, a cathode ray tube (CRT) or liquid crystal display (LCD). The display controller 735 and the I/O controller 745 can be implemented with conventional well-known technology.

The non-volatile storage 740 is often a magnetic hard disk, an optical disk, or another form of storage for large amounts of data. Some of this data is often written, by a direct memory access process, into memory 730 during execution of software in the computer 705. One of skill in the art will immediately recognize that the terms "machine-readable medium" or "computer-readable medium" includes any type of storage device that is accessible by the processor 720 and also encompasses a carrier wave that encodes a data signal.

The computing device 700 is one example of many possible computer systems that have different architectures. For example, personal computers based on an Intel microprocessor often have multiple buses, one of which can be an I/O bus for the peripherals and one that directly connects the processor 720 and the memory 730 (often referred to as a memory bus). The buses are connected together through bridge components that perform any necessary translation due to differing bus protocols.

Network computers are another type of computer system that can be used in conjunction with the teachings described here. Network computers do not usually include a hard disk or other mass storage, and the executable programs are loaded from a network connection into the memory 730 for execution by the processor 720. A Web TV system, which is known in the art, is also considered to be a computer system, but it may lack some of the components shown in FIG. 7, such as certain input or output devices. A typical computer system will usually include at least a processor, memory, and a bus coupling the memory to the processor.

Though FIG. 7 shows an example of the computing device 700, it is noted that the term "computer system," as used here, is intended to be construed broadly. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller. An example of a computer system is shown in FIG. 7.

The memory can include, by way of example but not limitation, random access memory (RAM), such as dynamic RAM (DRAM) and static RAM (SRAM). The memory can be local, remote, or distributed. As used here, the term "computer-readable storage medium" is intended to include only physical media, such as memory. As used here, a computer-readable medium is intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

The bus can also couple the processor to the non-volatile storage. The non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software on the computer system. The non-volatile storage can be local, remote, or distributed. The non-volatile storage is optional because systems can be created with all applicable data available in memory.

Software is typically stored in the non-volatile storage. Indeed, for large programs, it may not even be possible to store the entire program in the memory. Nevertheless, it should be understood that for software to run, if necessary, it is moved to a computer-readable location appropriate for processing, and for illustrative purposes, that location is referred to as the memory here. Even when software is moved to the memory for execution, the processor will typically make use of hardware registers to store values associated with the software, and local cache that, ideally, serves to speed up execution. As used here, a software program is assumed to be stored at an applicable known or convenient location (from non-volatile storage to hardware registers) when the software program is referred to as "implemented in a computer-readable storage medium." A processor is considered to be "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus can also couple the processor to the interface. The interface can include one or more input and/or output (I/O) devices. The I/O devices can include, by way of example but not limitation, a keyboard, a mouse or other pointing device, disk drives, printers, a scanner, and other I/O devices, including a display device. The display device can include, by way of example but not limitation, a cathode ray tube (CRT), liquid crystal display (LCD), or some other applicable known or convenient display device. The interface can include one or more of a modem or network interface. It will be appreciated that a modem or network interface can be considered to be part of the computer system. The interface can include an analog modem, isdn modem, cable modem, token ring interface, satellite transmission interface (e.g. "direct PC"), or other interfaces for coupling a computer system to other computer systems. Interfaces enable computer systems and other devices to be coupled together in a network.

Figure 8:
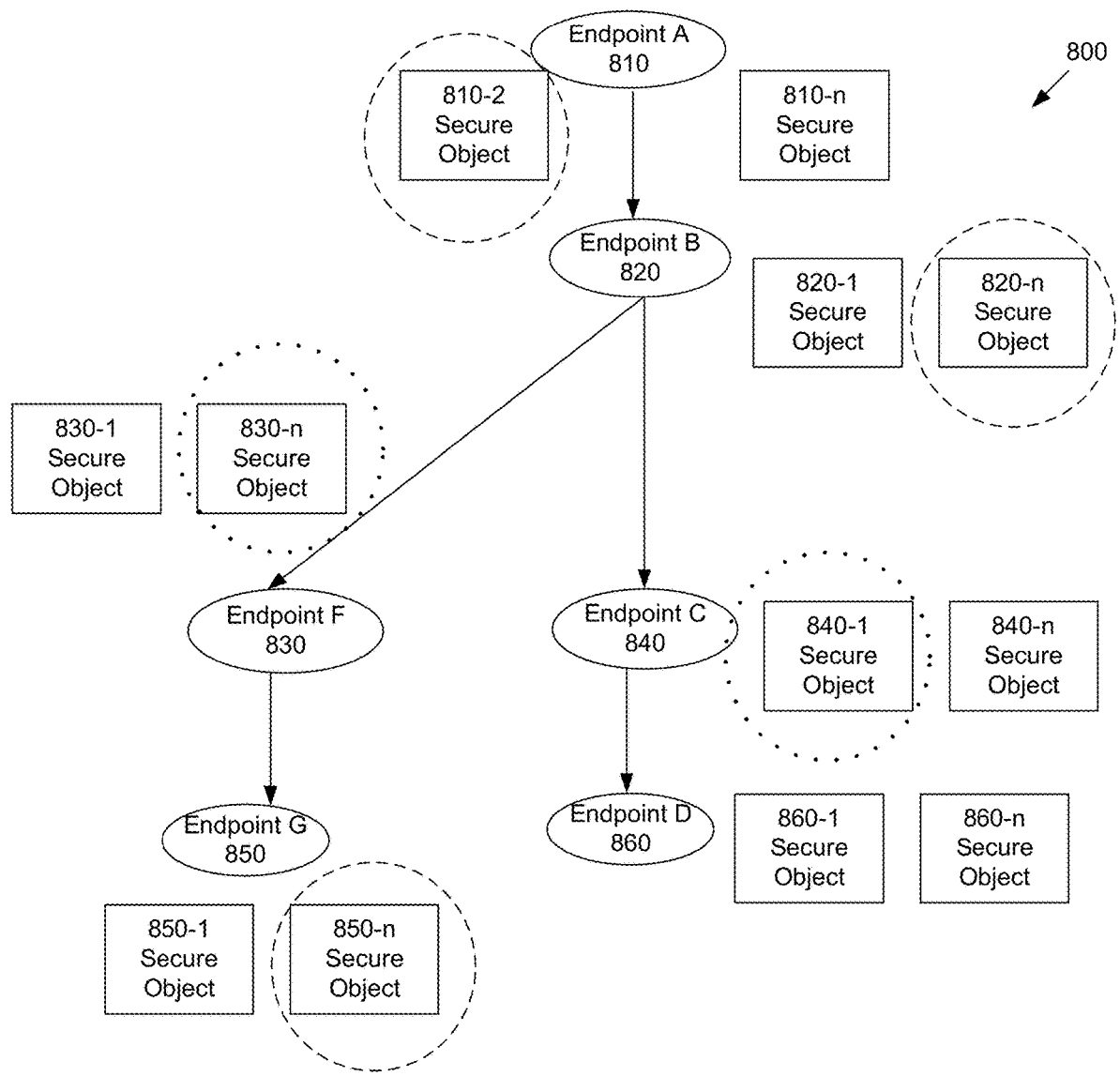
FIG. 8 is a staged level diagram illustrating packet flow between different devices on the private network with life cycle parameters.

FIG. 8 shows different stages 800 with regards to life cycle policy enforcement on different secure objects that reside on different computing devices. For example, in one embodiment, secure object at 810-2 is related to conversation 1. Copies of the same conversation object are also with 820-$n$ and 850-$n$ as marked with the dashed circle. An action triggered for conversation object 1 will be synchronized through the network with an update for all the copies of that particular conversation object 1. For example, if 820-$n$ sends a message object to 810-2, that message object will also be added to the conversation object with alias 850-$n$. When the source or originator of message object from 820-$n$ wants to delete that object, all the corresponding copies of the message object are deleted network wide. If the originator of the conversation object, alias 810-2 decides to delete the conversation, all the of the related conversation objects including all of the encompassed message objects will be deleted network wide.

In another example, alias 830-$n$ and alias 840-1 have the same conversation object. Endpoints 810 to 860 are different aliases operating on different computing devices on the private network. The secure objects that are stored locally on an end point are shown in square boxes with the same alias number near the endpoints. Alias 830-$n$ can make a copy of the conversation object and then request deletion of the original conversation object. Since the original conversation object originated from 830-$n$, the alias has full control on making copies including retaining a duplicate copy and then requesting a deletion of all of the copies network wide. Similarly, while alias 840-1 cannot make a duplicate copy of the entire conversation object for itself, the alias can make a duplicate copy of all of the messages that originated from it. Alias 840-1 may have a default rule to make a copy of all of the secure objects that were sourced by it before deleting conversation objects triggered by others. A person of ordinary skill in the art would appreciate that the enforcing communication semantics allows each user to individually customize its behavior and recording capabilities. Similar to a real world situation, the originator of the information always has control in the digital world of the private network.

In one embodiment, a distributed or de-centralized garbage collector module is implemented on all of the endpoints with associated aliases. The garbage collector module works to update the list of secure objects on a computing device, indexing and cleaning up of all deleted objects and associated tables. The garbage collector works independently on each computing device and may give status updates to other garbage collector modules that then report up to the operating system of the computing devices on the private network. To the extent there are any loose ends or rogue systems, the garbage collector notifications and updates work as additional verification that the underlying computing devices are operating as expected and the security and encryption of the data is not violated.

Figure 9:
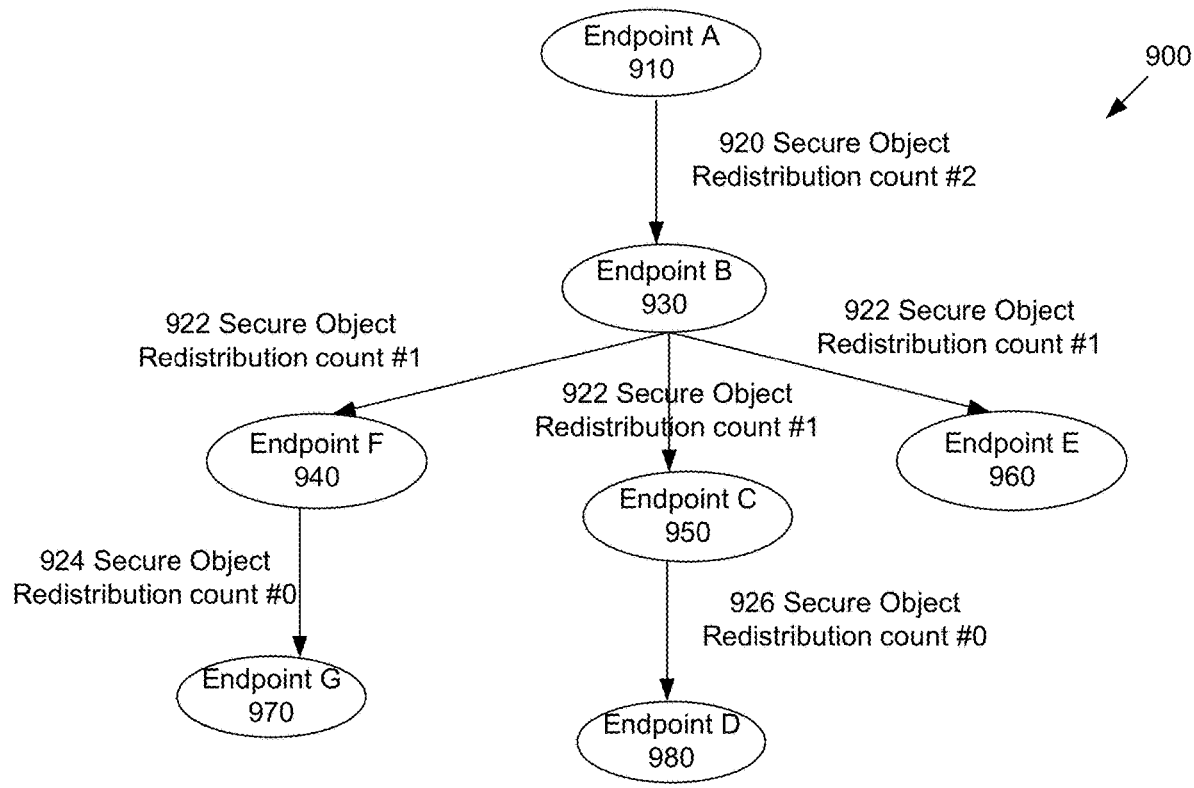
FIG. 9 is a staged level diagram illustrating packet flow between different devices on the private network with distribution policy.

FIG. 9 shows different stages 900 of enforcement of a distribution policy according to one embodiment. Endpoints 910 to 980 are different aliases operating on different computing devices on the private network. The secure object that propagates or is in transmission are marked as 920, 933, 924 and 926. For example, secure object 922 may originate from Endpoint A with Alias 910. Alias 910 initializes the secure object with redistribution allowed flag yes and a redistribution count to be 2. Alias 910 just sends it to Endpoint B 930. Now Endpoint B has an option to redistribute the secure object further since the redistribution count is higher than zero. Endpoint B can redistribute to aliases on Endpoint B's whitelist. Endpoint B can forward to as many aliases as it wants by decrementing the redistribution count to 1. Endpoint F 940, Endpoint C 950 and Endpoint E 960 all receive the secure object. Each of them can then decide whether to distribute further or not. Endpoint E does not opt to forward the secure object further. Endpoint C forwards the secure object to Endpoint D 980. Endpoint F forwards the secure object to Endpoint G 970. Endpoints G and D cannot forward anymore because the redistribution count is now zero.

A person of ordinary skill in the art would appreciate that enforcing communication semantics on the private network allows for network wide control and flexibility for the encapsulated data in the secure objects. Either an end-user or a computing device with artificial intelligence modules can control through the use of aliases equivalent functions to control the life cycle and distribution of data that originates from that alias.

Several components described here, including clients, servers, and engines, can be compatible with or implemented using a cloud-based computing system. As used here, an overlay network including, for example, a peer to peer network, is a system that provides computing resources, software, and/or information to client systems by maintaining de-centralized services and resources that the client systems can access over a communications interface, such as a network. A person of ordinary skill in the art would understand that different modules or components described herein could be implemented using a cloud-based computing system. Such systems can involve a subscription for services or use a utility pricing model. Users can access the protocols of the private network through a web browser or other container application located on their client system.

The invention disclosure describes techniques that those of skill in the art can implement in numerous ways. For instance, those of skill in the art can implement the techniques described here using a process, an apparatus, a system, a composition of matter, a computer program product embodied on a computer-readable storage medium, and/or a processor, such as a processor configured to execute instructions stored on and/or provided by a memory coupled to the processor. Unless stated otherwise, a component such as a processor or a memory described as being configured to perform a task may be implemented as a general component that is configured to perform the task at a given time or a specific component that is manufactured to perform the task. As used here, the term 'processor' refers to one or more devices, circuits, and/or processing cores configured to process data, such as computer program instructions.

A detailed description of one or more implementations of the invention is provided here along with accompanying figures that illustrate the principles of the invention. The invention is described in connection with such implementations, but the invention is not limited to any implementation. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Techniques described here relate to apparatus for performing the operations. The apparatus can be specially constructed for the required purposes, or it can comprise a general-purpose computer selectively activated or reconfigured by a computer program stored in the computer. Such a computer program may be stored in a computer-readable storage medium, such as, but is not limited to, read-only memories (ROMs), random access memories (RAMS), EPROMs, EEPROMs, magnetic or optical cards, any type of disk including floppy disks, optical disks, CD-ROMs, and magnetic-optical disks, or any type of media suitable for storing electronic instructions, and each coupled to a computer system bus. Although the foregoing implementations have been described in some detail for purposes of clarity of understanding, implementations are not necessarily limited to the details provided.

A number of embodiments have been described. Nevertheless, it will be understood that various modifications may be made without departing from the spirit and scope of the claimed invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It may be appreciated that the various systems, methods, and apparatus disclosed herein may be embodied in a machine-readable medium and/or a machine accessible medium compatible with a data processing system (e.g., a computer system), and/or may be performed in any order.

The structures and modules in the figures may be shown as distinct and communicating with only a few specific structures and not others. The structures may be merged with each other, may perform overlapping functions, and may communicate with other structures not shown to be connected in the figures.

The above-described functions and components may be comprised of instructions that are stored on a storage medium such as a computer readable medium. The instructions may be retrieved and executed by a processor. Some examples of instructions are software, program code, and firmware. Some examples of storage medium are memory devices, tapes, disks, integrated circuits, and servers. The instructions are operational when executed by the processor to direct the processor to operate in accord with some embodiments. Those skilled in the art are familiar with instructions, processor(s), and storage medium.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention. A detailed description of one or more implementations of the invention is provided here along with accompanying figures that illustrate the principles of the invention. The invention is described in connection with such implementations, but the invention is not limited to any implementation. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The structures and modules in the figures may be shown as distinct and communicating with only a few specific structures and not others. The structures may be merged with each other, may perform overlapping functions, and may communicate with other structures not shown to be connected in the figures.

The invention claimed is:

1. A method of enforcing communications semantics on a private network, comprising:
    establishing a secure and encrypted private network with a whitelist of two or more profiles using alias and digital keys;
    associating each one of said profiles with equal access and control irrespective of its associated computing device capability;
    embedding communication information from two or more applications used by the profile at source or destination in secure endpoint object;
    embedding the communication information when in transit in a secure conversation object wherein each conservation object has one or more message objects with one or more attributes comprising of source address, destination address, time sent, or time received;
    enforcing one or more of distribution parameters or life cycle parameters for the communication information;
    receiving the communication information at source or destination secure endpoint object and when in transit in a secure conversation object through the profile on the private network from two or more applications.

2. The method of claim 1, further comprising:
    setting the distribution or life cycle parameters at the profile for default operation;
    allowing customization of the distribution or life cycle parameters at the conversation object or message object by the profile at the source secure endpoint object;
    wherein the distribution parameters include one or more of the following: redistribution allowed, redistribution count, redistribution time expiry, redistribution geographic perimeter, redistribution location marker, or redistribution geo port; or
    wherein the life cycle parameters include one or more of the following: scheduling transit time, read count, usage count, one-time passcode.

3. The method of claim 2, further comprising:
    decrementing the redistribution count for each transit;
    preventing redistribution when redistribution count reaches zero.

4. The method of claim 1, wherein the message object has one or more of the following properties:
    copying of the message object within two or more conversation objects is allowed freely for the profile at the source secure endpoint object of the message object;
    the distribution and life cycle parameters are inherited from the conversation object the message object belongs to; or
    deletion of the message object by the source profile, private network wide zeroization, or expiry of the life cycle of all of the conversation objects it belongs to.

5. The method of claim 1, further comprising:
    preventing deletion or copying of communication information outside of the whitelist of the private network if at the time of creating the communication information the redistribution count is zero; or
    preventing deletion or copying of the communication information outside of one or more whitelists of the private networks included in redistribution.

6. The method of claim 1, further comprising:
    preventing screen capture when the communication information is within a secure endpoint object; or
    preventing deletion or copying of the communication information inside of the private network that conflicts with one or more distribution or lifecycle parameters.

7. The method of claim 1, further comprising:
    revoking the second profile from the whitelist of the first profile;
    automatically deleting all objects from the first profile, the second profile and the private network that have communication information between the first profile and the second profile.

8. The method of claim 1, further comprising:
    accepting receipt of the communication information from the profiles on one or more of the whitelists of the private network based on redistribution irrespective of the quality or content of the communication information;
    preventing receipt of unsolicited communication information on the private network; or
    providing indication on the first profile if any rules of the private network are violated.

9. The method of claim 1, further comprising:
    setting a life cycle parameter of expiry time for any the communication information between a first profile and a second profile;
    automatically deleting all objects from the first profile, the second profile and the private network that have communication information between the first profile and the second profile after the expiry time.

10. The method of claim 1, wherein the first profile computing device is one or more of the following: a personal computer, a laptop, a tablet, a handheld device, a smartphone, an internet of things device.

11. A system of enforcing communications semantics on a private network, comprising:
    a secure and encrypted private network with two or more profile computing device configured to:
        establish a whitelist of the two or more profiles using alias and digital keys;
        associate each one of said profiles with equal access and control irrespective of its associated computing device capability;
        embed communication information from two or more applications used by the profile at source or destination in secure endpoint object;
        embed the communication information when in transit in a secure conversation object wherein each conservation object has one or more message objects with one or more attributes comprising of source address, destination address, time sent, or time received;

enforce one or more of distribution parameters or life cycle parameters for the communication information;

receive the communication information at source or destination secure endpoint object and when in transit in a secure conversation object through the profile on the private network from two or more applications.

12. The system of claim 11, wherein the secure and encrypted private network with two or more profile computing device further configured to:

set the distribution or life cycle parameters at the profile for default operation;

allow customization of the distribution or life cycle parameters at the conversation object or message object by the profile at the source secure endpoint object;

wherein the distribution parameters include one or more of the following: redistribution allowed flag, redistribution count, redistribution time expiry, redistribution geographic perimeter, redistribution location marker, or redistribution geo port; or wherein the life cycle parameters include one or more of the following: scheduling transit time, read count, usage count, one-time passcode.

13. The system of claim 12, wherein the private network is further configured to:

decrement the redistribution count for each transit;

prevent redistribution when redistribution count reaches zero.

14. The system of claim 11, wherein the message object has one or more of the following properties:

copying of the message object within two or more conversation objects is allowed freely for the profile at the source secure endpoint object of the message object;

the distribution and life cycle parameters are inherited from the conversation object the message object belongs to; or deletion of the message object by the source profile, private network wide zeroization, or expiry of the life cycle of all of the conversation objects it belongs to.

15. The system of claim 11, wherein the private network is further configured to:

prevent deletion or copying of communication information outside of the whitelist of the private network if at the time of creating the communication information the redistribution count is zero; or prevent deletion or copying of the communication information outside of one or more whitelists of the private networks included in redistribution.

16. The system of claim 11, wherein the private network is further configured to:

prevent screen capture when the communication information is within a secure endpoint object; or prevent deletion or copying of the communication information inside of the private network that conflicts with one or more distribution or lifecycle parameters.

17. The system of claim 11, wherein the private network is further configured to:

revoke the second profile from the whitelist of the first profile;

automatically delete all objects from the first profile, the second profile and the private network that have communication information between the first profile and the second profile.

18. The system of claim 11, wherein the private network is further configured to:

accept receipt of the communication information from the profiles on one or more of the whitelists of the private network based on redistribution irrespective of the quality or content of the communication information;

prevent receipt of unsolicited communication information on the private network; or provide indication on the first profile if any rules of the private network are violated.

19. The system of claim 11, wherein the private network is further configured to:

set a life cycle parameter of expiry time for any the communication information between a first profile and a second profile;

automatically delete all objects from the first profile, the second profile and the private network that have communication information between the first profile and the second profile after the expiry time.

20. The system of claim 11, wherein the first profile computing device is one or more of the following: a personal computer, a laptop, a tablet, a handheld device, a smartphone, an internet of things device.

* * * * *